United States Patent
Imanishi et al.

(10) Patent No.: US 8,361,672 B2
(45) Date of Patent: Jan. 29, 2013

(54) TUBULAR FUEL CELL AND MANUFACTURING METHOD THEREOF

(75) Inventors: Masahiro Imanishi, Toyota (JP); Haruyuki Nakanishi, Toyota (JP); Naoto Yoda, Ueda (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 968 days.

(21) Appl. No.: 12/093,215

(22) PCT Filed: Nov. 9, 2006

(86) PCT No.: PCT/IB2006/003159
§ 371 (c)(1), (2), (4) Date: May 9, 2008

(87) PCT Pub. No.: WO2007/054794
PCT Pub. Date: May 18, 2007

(65) Prior Publication Data
US 2008/0280181 A1    Nov. 13, 2008

(30) Foreign Application Priority Data
Nov. 10, 2005  (JP) ................. 2005-326725

(51) Int. Cl.
*H01M 8/24* (2006.01)
*H01M 8/10* (2006.01)
*H01M 4/64* (2006.01)

(52) U.S. Cl. ................ 429/466; 429/497; 429/517

(58) Field of Classification Search .......... 429/497, 429/466, 517
See application file for complete search history.

(56) References Cited

U.S. PATENT DOCUMENTS

| | | | |
|---|---|---|---|
| 6,060,188 A | 5/2000 | Muthuswamy et al. | |
| 6,444,339 B1* | 9/2002 | Eshraghi | 429/437 |
| 6,506,511 B1* | 1/2003 | Lakeman et al. | 429/421 |
| 2004/0001988 A1 | 1/2004 | Yazici et al. | |
| 2004/0175605 A1* | 9/2004 | Eshraghi et al. | 429/31 |
| 2005/0042490 A1* | 2/2005 | Finnerty et al. | 429/31 |
| 2007/0166589 A1 | 7/2007 | Nakanishi et al. | |
| 2007/0218337 A1 | 9/2007 | Nakanishi | |

FOREIGN PATENT DOCUMENTS

| | | |
|---|---|---|
| EP | 1 166 382 | 10/2003 |
| JP | 2006216419 A * | 8/2006 |

OTHER PUBLICATIONS

U.S. Appl. No. 11/991,532, filed Mar. 6, 2008.

* cited by examiner

*Primary Examiner* — Barbara Gilliam
*Assistant Examiner* — Robert S Carrico
(74) *Attorney, Agent, or Firm* — Oblon, Spivak, McClelland, Maier & Neustadt, L.L.P.

(57) ABSTRACT

A tubular fuel cell including: a center support member made from a wire rod; an electrolyte layer formed upon the outside of the center support member; an outer circumferential support member disposed between the center support member and the electrolyte layer, and which is made from a wire rod; a catalyst layer formed upon the outer circumferential surface of the outer circumferential support member, and that is in contact with the electrolyte layer; and an auxiliary outer circumferential support member provided between the center support member and the outer circumferential support member, and which is made from a wire rod.

18 Claims, 3 Drawing Sheets

RELATED ART

TUBULAR FUEL CELL AND MANUFACTURING METHOD THEREOF

BACKGROUND OF THE INVENTION

1. Field of the Invention

The present invention relates to a tubular fuel cell and a manufacturing method thereof, and in particular relates to a tubular fuel cell and a manufacturing method thereof, with which enhanced gas diffusion may be obtained.

2. Description of the Related Art

With the objective of enhancing output density per unit area beyond its current plateau and the like, recently research has been progressing in relation to fuel cells of the tubular (hereinafter sometimes termed "tubular PEFC"s). A unit cell of a tubular PEFC (hereinafter sometimes termed a "tubular cell") generally includes a Membrane/Electrode Assembly (MEA) which has a hollow electrolyte layer and catalyst layers disposed upon the inside and upon the outside of this electrolyte layer. And, due to the supply of reaction gases (a gas which includes hydrogen and a gas which includes oxygen) to the inside and the outside of the MEA, an electrochemical reaction occurs, and the electrical energy which is generated by this electrochemical reaction is extracted to the exterior via collectors which are disposed upon the inside and the outside of the MEA (hereinafter, the collector which is disposed upon the inside will be termed the "internal collector", while the collector which is disposed upon the outside will be termed the "external collector"). In other words, with a tubular PEFC, electrical energy may be extracted by supplying one reaction gas (the gas which includes hydrogen or the gas which includes oxygen) to the insides of the MEAs provided in each unit cell, while supplying the other reaction gas (the gas which includes oxygen or the gas which includes hydrogen) to their outsides. Since, with a tubular PEFC, it is possible to make the reaction gas which is supplied to the external surfaces of two neighboring unit cells be of the same type, accordingly separators for performing shielding or the like of the gas, as in the case of a conventional flat plate type PEFC, become unnecessary. Due to this, according to a tubular PEFC, it becomes possible to anticipate making the unit cells more compact in an effective manner.

As a technique related to a tubular fuel cell, for example, in Published Japanese National Phase Application 2002-539587 of PCT application, there is disclosed a tubular type fuel cell, in which a fuel cell element is designed as being a tubular type composite member made from an assembly consisting of a bundle of electrically conductive members and/or wire rods, and an ion conduction member disposed thereupon. It is disclosed that, according to this technique, the output density is increased and supply of materials and discharge of energy become simple and easy.

As described above, with a tubular PEFC, since electrical energy is generated using reaction gases which are supplied to the inside and the outside of the MEA, it is necessary to ensure spaces at the inside and the outside of the MEA for flowing the reaction gases. As a method of forming an MEA at the outside of the internal collector in which a flow path and/or a gap for conducting a reaction gas is formed, a method has been considered of applying a catalyst ink and/or the electrolytic component, which is melted or dissolved, to the outer circumferential surface of the internal collector. However, when such a catalyst ink and/or electrolytic component, which is melted or dissolved, is simply applied to the outer circumferential surface of the internal collector, at least a portion of the flow paths and/or gaps for flowing the reaction gas come to be blocked by the above-described catalyst ink and/or electrolytic component, and it is easy for the diffusibility of the reaction gas to be decreased. This problem is difficult to solve with the technique disclosed in the above-identified Published Japanese National Phase Application 2002-539587 of PCT application.

SUMMARY OF THE INVENTION

Accordingly, the present invention provides a tubular fuel cell, and a manufacturing method thereof, which enhance gas diffusion.

According to one aspect of the present invention, a tubular fuel cell is provided with a center support member made from a wire rod, an electrolyte layer which is formed upon the outside of the center support member, and an outer circumferential support member which is disposed between the center support member and the electrolyte layer, and which is made from a wire rod. A catalyst layer is formed upon the outer circumferential surface of the outer circumferential support member, and is in contact with the electrolyte layer. An auxiliary outer circumferential support member, which is made from a wire rod, is disposed between the center support member and the outer circumferential support member.

According to this aspect of the present invention, the outer circumferential support member, upon which the catalyst layer is formed in advance, is provided between the center support member and the electrolyte layer. Due to this, during manufacture, components of the catalyst layer (such as, for example a component of the catalyst, layer which is melted or dissolved) are prevented from flowing into the space for passage of the reaction gas, so that the diffusion of the reaction gas is enhanced. Furthermore, since the above-described outer circumferential support member and the auxiliary outer circumferential support member are provided between the center support member and the electrolyte layer, accordingly, during manufacture, components of the electrolyte layer (such as, for example a component of the electrolyte layer which is melted or dissolved; hereinafter simply termed an "electrolytic component") are prevented from flowing into the space for passage of the reaction gas, so that the diffusion of the reaction gas is enhanced. Thus, according to this aspect of the present invention, it is possible to supply a tubular fuel cell in which the diffusion of the reaction gas is enhanced, since it is possible to ensure an appropriate space for passage of the reaction gas.

As examples of materials from which the center support member may be made, a material which is capable of being utilized as a material for manufacturing the internal collector of a tubular PEFC, for example Cu, Au, Pt, Al, Ti, or the like, may be employed. The material from which the auxiliary outer circumferential support member and the outer circumferential support member is made may be the same as the above-described material for the center support member. The center support member, the auxiliary outer circumferential support member, and the outer circumferential support member need to be endowed with a sufficient resistance to corrosion which is able to stand up to the operational environment of the fuel cell. In particular, it is desirable for the center support member and the auxiliary outer circumferential support member to be made from a material which has excellent electrical conductivity. If the center support member, the auxiliary outer circumferential support member, and/or the outer circumferential support member are made from Cu, then, in order to make them into members which are endowed with the above-described resistance to corrosion, it is desirable to cover their surfaces with a material which has high corrosion resistance (for example, Ti, Au, Pt, or the like).

Furthermore, the electrolyte layer and the catalyst layer according to the above-described aspect of the present invention may be manufactured by using materials which are generally used in tubular PEFCs. It should be understood that, in the following explanation, "wire rod" is a concept which includes, not only cylindrical material in rod form in which no interior through hole is formed, but also material in tubular form in which a through hole is formed along its axial direction.

In this tubular fuel cell, the diameter of the auxiliary outer circumferential support member may be smaller than the diameter of the outer circumferential support member.

Due to this, during manufacture, it is possible to suppress flowing in of the electrolytic component further towards the center support member (hereinafter, simply termed "inside") than the auxiliary outer circumferential support member, in a simple and easy manner. Accordingly, it is possible to enhance the diffusion of the reaction gas very simply and easily.

In this tubular fuel cell, a plurality of center support members may be provided.

Since, in this way, it is possible to ensure an appropriate space for passage of the reaction gas, accordingly it is possible to enhance the diffusion of the reaction gas in a simple and easy manner.

In this tubular fuel cell, at least one of the center support member, the auxiliary outer circumferential support member, and the outer circumferential support member may be formed in a helicoid shape about the axial direction of the tubular fuel cell.

By "forming at least one of the center support member, the auxiliary outer circumferential support member, and the outer circumferential support member in a helicoid shape around the axial direction of the tubular fuel cell", it is meant that, by twisting at least one or more of the center support member, the auxiliary outer circumferential support member, and the outer circumferential support member, this twisted member (wire rod) is formed into a helicoid shape with respect to the axial direction of the tubular cell of the tubular fuel cell. In particular, it is desirable to make the auxiliary outer circumferential support members and/or the outer circumferential support members in a twisted state, in order to make it possible to ensure the space for passage of the reaction gas in a simple and easy manner. It should be understood that, in the following explanation, when "the axial direction of the cell" is not mentioned, the axial direction of each of the wound members (wire rods) is meant, unless particularly stated to the contrary.

If the center support member is formed in a helicoid shape, this tubular fuel cell can be handled more conveniently and easily, since its durability against bending stress is enhanced. Moreover since, if the auxiliary outer circumferential support members and/or the outer circumferential support members are formed in a helicoid shape, then it is possible to plug the gaps between the auxiliary outer circumferential support members and/or the outer circumferential support members in a simple and easy manner, accordingly it is possible to suppress flowing in of the electrolytic component further to the inside than the auxiliary outer circumferential support member. Thus, with this structure, it is possible to enhance the diffusion of the reaction gas in this tubular fuel cell by yet a further level.

In this tubular fuel cell, the axial direction of the center support member and the axial direction of the auxiliary outer circumferential support member may intersect. Moreover, the axial direction of the auxiliary outer circumferential support member and the axial direction of the outer circumferential support member may intersect.

By the term "axial direction" is meant the direction of the axis of the member (the wire rod) which is twisted. As example of a way in which the axial directions of two members of such a tubular fuel cell which adjoin one another in the radial direction may be made to intersect, their twist pitches per unit length may be varied (for example, the twist pitch of one of the members may be set to 1, while the twist pitch of the other member is set to 2), or the directions in which the members are twisted may be varied (for example, one of the members may be twisted in the clockwise direction, while the other member is twisted in the anticlockwise direction), or the like.

By making the tubular fuel cell so that the axial directions of two members which adjoin one another in the radial direction intersect, it is possible to suppress flowing in of the electrolytic component further to the inside than the auxiliary outer circumferential support member in a simple and easy manner.

According to another aspect of the present invention, there is provided a method of manufacturing a tubular fuel cell, in which: an auxiliary outer circumferential support member made from a wire rod is wound upon the outside of a center support member made from wire rod; an outer circumferential support member, upon the surface of which a catalyst layer has been formed, is wound upon the outside of the auxiliary outer circumferential support member which has been wound upon the outside of the center support member, and an electrolyte layer is formed upon the outside of the outer circumferential support member which has been wound upon the outside of the auxiliary outer circumferential support member, by applying a melted or dissolved electrolytic component thereupon.

According to the above-described aspect of the present invention, since, after winding the auxiliary outer circumferential support members upon the outside of the center support members, the outer circumferential support members, upon which the catalyst layer has been formed in advance, are further wound upon the outside thereof, accordingly, during manufacture, it is possible to prevent components of the catalyst layer (for example a catalyst layer component in a dissolved or melted state) from flowing into the space for passage of the reaction gas. Furthermore since the electrolytic component which has been melted or dissolved is applied after the auxiliary outer circumferential support members and the outer circumferential support members have been wound upon the outside of the center support member, accordingly it is possible to suppress flowing in of the electrolytic component further to the inside than the auxiliary outer circumferential support members. Accordingly it is possible to provide a manufacturing method for a tubular fuel cell which enhances the diffusion of the reaction gas, since it is possible to ensure the space for passage of the reaction gas.

Here the term "winding" is a concept which includes, not only winding of one member (the auxiliary outer circumferential support members, or the outer circumferential support members upon which the catalyst layer has been formed; and the same henceforward) around another member (the center support member, or the center support member and the auxiliary outer circumferential support members; and the same henceforward), but also positioning a plurality of one member so that they contact the outer circumferential surface of another member, or twisting a plurality of the one member so as to leave a space in the center, and inserting the other member into that space, so that the one members contact the other member. As examples of materials from which the center support member may be made, a material which is capable of being utilized as a material for manufacturing the internal collector of a tubular PEFC, for example Cu, Au, Pt, Al, Ti, or the like, may be employed. Moreover, the material from which the auxiliary outer circumferential support members and the outer circumferential support members are made may be the same as the above-described material for the center support member. The center support member, the auxiliary outer circumferential support members, and the outer circumferential support members need to be endowed with a sufficient resistance to corrosion which is able to stand up to the operational environment of the fuel cell; and, in particular, it is desirable for the center support member and the auxiliary outer circumferential support members to be made from a material which has excellent electrical conductivity. If the center support member, the auxiliary outer circumferential support members, and/or the outer circumferential support members are made from Cu, then, in order to make them into members which are endowed with the above-described resistance to corrosion, their surfaces may be covered with a material which has high corrosion resistance (for example, Ti, Au, Pt, or the like). Furthermore, the electrolyte layer and the catalyst layer according to the present invention may be manufactured by using materials which are generally used in tubular PEFCs.

In this method of manufacturing a tubular fuel cell, the diameter of the auxiliary outer circumferential support member may be smaller than the diameter of the outer circumferential support member.

Due to this, during manufacture, it is possible to suppress flowing in of the electrolytic component further to the inside than the auxiliary outer circumferential support member in a simple and easy manner. Accordingly, it is possible simply and easily to enhance the diffusion of the reaction gas in this tubular fuel cell manufactured in this manner.

In this method of manufacturing a tubular fuel cell, the auxiliary outer circumferential support member may be wound so that the axial direction of the auxiliary outer circumferential support member and the axial direction of the center support member intersect.

Due to this, during manufacture, it is possible to suppress flowing in of the electrolytic component further to the inside than the auxiliary outer circumferential support member in a simple and easy manner.

As a method for winding the auxiliary outer circumferential support members so that they intersect the axial direction of the center support member, for example, if the center support member is not twisted, it would also be acceptable to arrange to wind on the auxiliary outer circumferential support members while twisting them. Furthermore, if the center support member is twisted, it would also be acceptable to arrange to employ a structure in which the auxiliary outer circumferential support members are twisted at a different pitch from the twist pitch of the center support member, or a structure in which the auxiliary outer circumferential support members are twisted in a different direction (for example, the anticlockwise direction) from the direction of twisting of the center support member (for example, the clockwise direction), or the like.

In this method of manufacturing a tubular fuel cell, the outer circumferential support member may be wound so that the axial direction of the outer circumferential support member and the axial direction of the auxiliary outer circumferential support member intersect.

Due to this, during manufacture, it is possible to suppress flowing in of the electrolytic component further to the inside than the auxiliary outer circumferential support member in a simple and easy manner.

As a concrete example of a method of winding the outer circumferential support members so that they intersect the axial directions of the auxiliary outer circumferential support members, the same method may be employed as described above with reference to a method for winding the auxiliary outer circumferential support members so as to intersect the axial directions of the center support members, with the substitution of the auxiliary outer circumferential support members for the center support members, and with the substitution of the outer circumferential support members for the auxiliary outer circumferential support members.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 3:
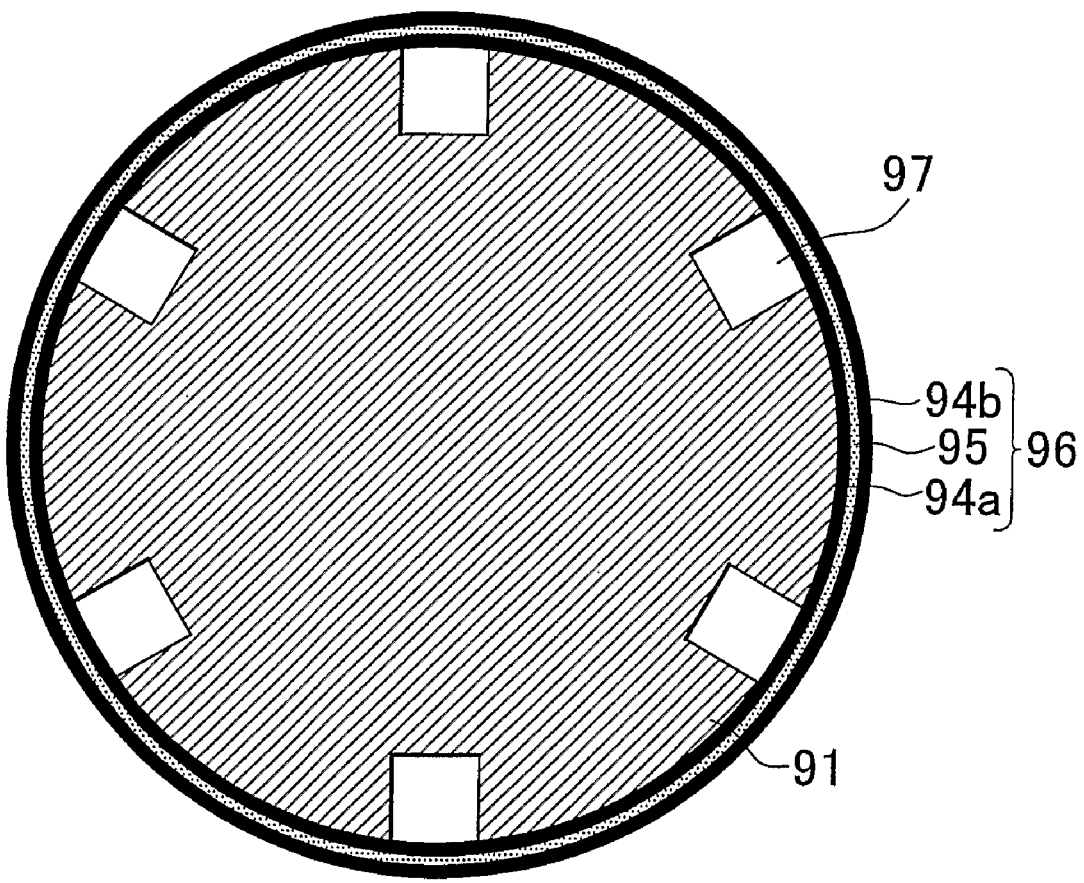
FIG. 3 is an enlarged sectional view showing a portion of a tubular fuel cell of related art.

In order to facilitate the understanding of the present invention, first a tubular fuel cell according to the related art will be explained in outline. FIG. 3 is an enlarged sectional view showing a portion of such a related art tubular fuel cell. As shown in this figure, in this related art tubular fuel cell 90, an MEA 96 which includes an internal catalyst layer 94a, an electrolyte layer 95, and an external catalyst layer 94b is formed upon the outside of an internal collector 91 in which reaction gas flow paths 97 are formed; and an external collector (not shown in the figure) is disposed upon the outside of this MEA 96. As a method of manufacturing an MEA 96 included in such a tubular fuel cell, for example, there is a per se known method of applying and drying a catalyst layer component which has been dissolved or melted (for example a substance in ink form, in which a constituent material or component of the interior catalyst layer 94a is dissolved in a solvent) to the outside of the internal collector 91, and then, after having applied and dried an electrolytic component which has been dissolved or melted (for example a substance in ink form, in which a constituent material or component of the electrolyte layer 95 is dissolved in a solvent), applying and drying a catalyst layer component which has been dissolved or melted (for example a substance in ink form, in which a constituent material or component of the exterior catalyst layer 94b is dissolved in a solvent). With this process, when forming the MEA 96 on the outside of the internal collector 91, the above-described catalyst layer component and/or electrolytic component flow into the reaction gas flow paths 97 which are formed upon the internal collector 91, so that portions or the entirety of these reaction gas flow paths 97 are blocked, and thereby the diffusion of the reaction gas is decreased, so that the performance of this tubular fuel cell is decreased. In order to enhance the performance of the fuel cell, it is necessary to enhance the diffusion of the reaction gas, and, to this end, it is desirable to provide a tubular fuel cell in which the catalyst layer component and/or the electrolytic component do not flow into the reaction gas flow paths 97.

Thus, according to the embodiment of the present invention explained below, by ensuring sufficient space for the reaction gas to diffuse, a tubular fuel cell, and a manufacturing method thereof are provided, with which the diffusion of the reaction gas is enhanced.

Embodiments of the tubular fuel cell and the manufacturing method thereof according to the present invention will now be explained in concrete terms with reference to the drawings. It should be understood that, in the following explanation, portions closer to the axial center of the tubular fuel cell will be referred to as being "inside", while portions more remote therefrom will be termed "outside"; and portions more inside than the electrolyte layer will be termed "interior", while portions more outside will be termed "external". Furthermore, in FIG. 1, center support members, auxiliary outer circumferential support members, and outer circumferential support members are twisted at predetermined pitches, and, if the pitch at which the center support members is twisted is termed X, the pitch at which the auxiliary outer circumferential support members is twisted is termed Y, and the pitch at which the outer circumferential support members is twisted is termed Z, then $X \neq Y$ and $Y \neq Z$. Moreover, the diameter (R1) of the auxiliary outer circumferential support members is smaller than the diameter (R2) of the outer circumferential support members.

Figure 1:
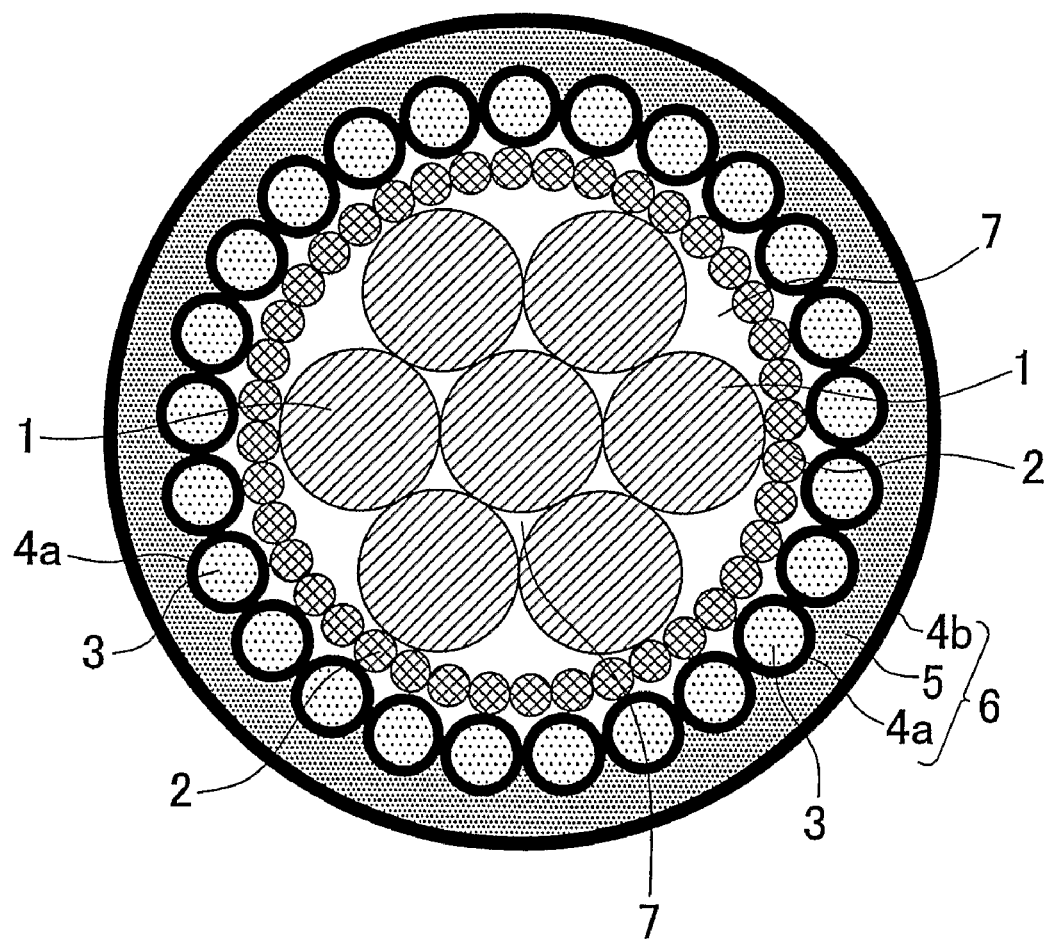
FIG. 1 is a sectional view schematically showing an embodiment of the tubular fuel cell of the present invention.

FIG. 1 is a sectional view schematically showing this embodiment of the tubular fuel cell of the present invention, and shows a portion of the tubular fuel cell in enlarged view. As shown in this figure, the tubular fuel cell 10 of this embodiment includes center support members which are made from a plurality of wire rods and serves as an internal collector, and an electrolyte layer 5 which is formed upon the outside thereof; and, between these, from the inside outwards, there are arranged a layer of auxiliary outer circumferential support members 2, which are made from a plurality of wire rods, and a layer of outer circumferential support members 3, which are made from a plurality of wire rods. In this tubular fuel cell 10, the center support members 1, the auxiliary outer circumferential support members 2, and the outer circumferential support members 3 are made by coating Ti upon the surface of copper wire. In addition, the surfaces of the center support members 1 are made hydrophilic (hydrophilic processing, hereinafter), and the surfaces of the auxiliary outer circumferential support members 2 are made water-repellant (water-repellant processing, hereinafter). The auxiliary outer circumferential support members 2 are wound around the center support members 1, and the outer circumferential support members 3 are wound around the center support members 1 and the auxiliary outer circumferential support members 2, with inside catalyst layers 4a being formed on their outer circumferential surfaces. And an outside catalyst layer 4b is further formed upon the outside of the electrolyte layer 5 which is formed upon the outside of the inside catalyst layer 4a, with an external collector (not shown in the figures) being provided upon the outside of this outside catalyst layer 4b. In this manner, with the tubular fuel cell 10 of this embodiment, by establishing a state in which the electrolyte layer 5 is further formed upon the outside of the auxiliary outer circumferential support members 2 and the outer circumferential support members 3 which themselves are disposed upon the outside of the center support members 1, accordingly, during the manufacture of this tubular fuel cell 10, the electrolytic component which has been melted or dissolved is prevented from flowing in further inwards than the auxiliary outer circumferential support members 2. Since there is no such flowing in of the electrolytic component which has been melted or dissolved further inwards than the auxiliary outer circumferential support members 2, accordingly it is possible to prevent the gaps 7 which are present at the inside of the auxiliary outer circumferential support members 2 from becoming blocked. Therefore the reaction gas (the gas which includes hydrogen or the gas which includes oxygen) diffuses into these gaps 7, so that the gas diffusion of this tubular fuel cell 10 is enhanced.

As shown in the figure, the center support members 1 according to this embodiment are made from a plurality of wire rods. If the center support members 1 are made in this manner from a plurality of wire rods, then the gaps 7 between the wire rods can be formed easily and simply, and the gaps 7 between the center support members 1 and the auxiliary outer circumferential support members 2 can also be formed simply and easily; and it is accordingly possible to ensure the diffusion path for the reaction gas. In other words, according to this type of structure, the diffusion of the reaction gas in this tubular fuel cell 10 can be enhanced.

With the tubular fuel cell 10 as shown in the figure, if the center support members 1 are formed in a helicoid shape, then the resilience of this tubular fuel cell 10 against bending stress is enhanced. In addition, if the auxiliary outer circumferential support members 2 and the outer circumferential support members 3 are formed in helicoid shapes, then it is possible simply and easily to plug up the gaps between the auxiliary outer circumferential support members 2, and between the outer circumferential support members 3. If these gaps are plugged up in this manner, then it is possible to prevent the electrolytic component which is applied to the outside of the outer circumferential support members 3 (in more concrete terms, to the outside of the inside catalyst layer 4a) and which is melted or dissolved, from shifting more to the inside than the auxiliary outer circumferential support members 2, and accordingly it is possible to avoid that the electrolytic component blocks the gaps 7 for passage of the reaction gas.

Furthermore, with this tubular fuel cell 10, the pitch X at which the center support members 1 are twisted, the pitch Y at which the auxiliary outer circumferential support members 2 are twisted, and the pitch Z at which the outer circumferential support members 3 are twisted, are set so that $X \neq Y$ and $Y \neq Z$. When forming the electrolyte layer 5 on the outside of the inside catalyst layer 4a, in order to prevent the above-described gaps 7 being blocked by the electrolytic component which is melted or dissolved, shifting of this electrolytic component must be intercepted by, at least, the auxiliary outer circumferential support members 2. In order to intercept shifting of the electrolytic component, it is effective to reduce the gaps through which the electrolytic component can arrive at the auxiliary outer circumferential support members 2; and, in order to reduce these gaps, it is effective to cause the axial directions of the auxiliary outer circumferential support members 2 and the axial directions of the outer circumferential support members 3 to intersect one another. Due to this, with the structure described above, shifting of the electrolytic component is intercepted, so that the existence of the gaps 7 for flowing of the reaction gas is ensured.

Furthermore, as shown in the figure, the diameters of the auxiliary outer circumferential support members 2 in this embodiment are smaller than the diameters of the outer circumferential support members 3. Even if the diameters of the auxiliary outer circumferential support members 2 are the same as the diameters of the outer circumferential support members 3, it is possible to intercept shifting of the electrolytic component. However, if these diameters are made to be as in this embodiment as shown in the figure, then it is possible to reduce the gaps between the auxiliary outer circumferential support members 2 by yet a further level. Thus, due to the auxiliary outer circumferential support members 2, it becomes possible to intercept shifting of the electrolytic component with good efficiency.

Figure 2:
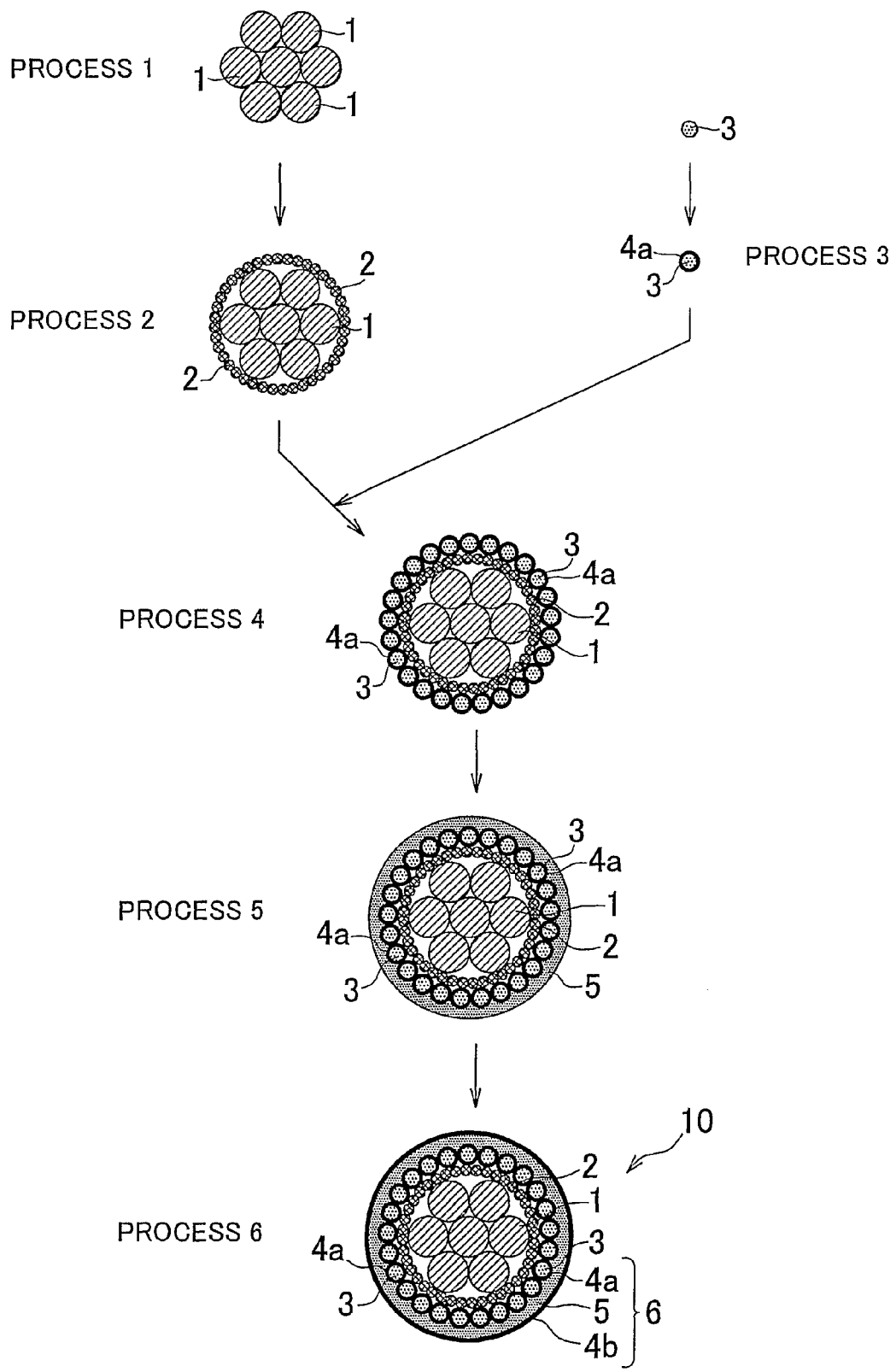
FIG. 2 is a schematic figure showing an embodiment of the manufacturing method of the tubular fuel cell of the present invention.

FIG. 2 is a schematic figure showing an example of the manufacturing method of the tubular fuel cell according to an embodiment of the present invention; in this figure, cross sections of the structural members included in this tubular fuel cell are schematically shown. In FIG. 2, to regions and members which have the same structure as in the tubular fuel cell shown in FIG. 1, the same reference symbols are appended as were used in FIG. 1, and the explanation thereof will be curtailed as appropriate. Furthermore, in FIG. 2, it is supposed that the center support members, the auxiliary outer circumferential support members, and the outer circumferential support members are twisted at predetermined pitches, and that, if the twist pitch of the center support members is taken as being X, the twist pitch of the auxiliary outer circumferential support members is taken as being Y, and the twist pitch of the outer circumferential support members is taken as being Z, then $X \neq Y$ and $Y \neq Z$. Moreover, the diameter (R1) of the auxiliary outer circumferential support members is smaller than the diameter (R2) of the outer circumferential support members. In addition, hydrophilic processing is performed upon the outer circumferential surfaces of the center support member, and water-repellant processing is performed upon the outer circumferential surfaces of the auxiliary outer circumferential support members. In the following, this manufacturing method for a tubular fuel cell according to an embodiment of the present invention will be explained in concrete terms with reference to FIG. 2.

As shown in FIG. 2, in the manufacturing method for a tubular fuel cell according to this embodiment, first, twisted center support members (the internal collector) 1 are manufactured by twisting together a plurality of copper wires, whose surfaces are covered with titanium (Ti), at the predetermined pitch (X) [Process #1]. Thereafter, the auxiliary outer circumferential support members 2, which includes a plurality of copper wires whose surfaces are covered with Ti, are wound in a helicoid shape upon the outside of this center support members 1 (Process #2: the first winding process). Meanwhile, by applying and drying a catalyst ink (for example, a substance in ink form, in which a catalyst such as platinum-carrying carbon or the like is dispersed in a solution including a fluorine-containing ion-exchange resin or the like which has been dissolved using an organic solvent; and the same hereinafter) upon the surfaces of copper wires whose surfaces are covered with Ti, outer circumferential support members 3 (hereinafter simply termed the "outer circumferential support members 3") are manufactured, upon whose surfaces a catalyst layer 4a is formed (Process #3). And the plurality of outer circumferential support members 3 which have been obtained by this Process #3 are wound in a helicoid shape upon the outside of the auxiliary outer circumferential support members 2 which have been wound by Process #2 (Process #4: the second winding process). After having formed a wound body by winding the outer circumferential support members 3 upon the outside of the center support member 1 and the auxiliary outer circumferential support members 2 in this manner, an electrolyte layer 5 is formed upon the outside of the outer circumferential support members 3 by applying and drying an electrolytic component (for example, a fluorine-containing ion-exchange resin or the like which is dissolved using an organic solvent) upon the outside of this wound body (Process #5: an electrolytic layer formation process). Thereafter an outside catalyst layer 4b is formed by applying and drying a catalyst ink upon the outside of this electrolyte layer 5 which has been manufactured by the Process #5, so that an MEA 6 is formed upon the outside of the internal collector (Process #6); and, furthermore, it is possible to manufacture the tubular fuel cell 10 according to the embodiment of the present invention by performing a process of contacting an external collector against the outside of this external catalyst layer 4b, and the like.

In Process #5 according to the present invention, as the method of applying the electrolytic component to the outside of the outer circumferential support members 3, there are various possible methods, such as a method of dipping the above-described wound body into a vessel containing the above-described dissolved fluorine-containing ion-exchange resin and then taking it out therefrom, or a method of applying the above-described dissolved fluorine-containing ion-exchange resin to the outer circumferential surface of the above-described wound body by spraying, or the like. As another possibility, it would also be acceptable to arrange to apply the electrolytic component by pressing out and covering (extrusion covering) the above-described fluorine-containing ion-exchange resin, in a heated and melted state, to the outer circumferential surface of the wound body. Here, for this extrusion covering, it would also be possible to employ the same method as a method utilized in the process of manufacturing electrical wire.

It should be understood that although, in the embodiment of FIG. 2, the case is shown in which the diameters of the auxiliary outer circumferential support members 2 are smaller than the diameters of the outer circumferential support members 3, the structure of the auxiliary outer circumferential support members and outer circumferential support members is not limited by this structure. For example, even if the diameters of the auxiliary outer circumferential support members and the diameters of the outer circumferential support members are the same, it is still possible to intercept shifting of the electrolytic component with the auxiliary outer circumferential support members and the outer circumferential support members which are provided upon the outside of the center support member.

Furthermore although, in the embodiment described above, a structure was described in which, the twist pitch X of the center support members 1 and the twist pitch Y of the auxiliary outer circumferential support members 2 satisfy $X \neq Y$, to make the axial directions of the center support members 1 and the axial directions of the auxiliary outer circumferential support members 2 intersect one another, the present invention is not limited to this structure. However it is desirable to make $X \neq Y$, since, if this is done, the task of the auxiliary outer circumferential support members 2 for intercepting the shifting of the electrolytic component becomes simple and easy, and it is accordingly possible to ensure a diffusion path for the reaction gas.

In addition although, in the embodiment described above, a structure was described in which the twist pitch Y of the auxiliary outer circumferential support members 2 and the twist pitch Z of the outer circumferential support members 3 satisfy $Y \neq Z$, to make the axial directions of the auxiliary outer circumferential support members 2 and the axial directions of the outer circumferential support members 3 intersect one another, the present invention is not limited to this structure. However it is desirable to make $Y \neq Z$, since, if this is done, the task of the auxiliary outer circumferential support members 2 for intercepting the shifting of the electrolytic component becomes simple and easy, and it is accordingly possible to ensure a diffusion path for the reaction gas. It should be understood that, if X≠Y and Y≠Z, then X=Z will be acceptable, or alternatively X≠Z will be acceptable.

Moreover although, in the above explanation related to the manufacturing method for the tubular fuel cell, a situation was shown in which, by changing the twist pitches, the axial directions of the center support members 1, the axial directions of the auxiliary outer circumferential support members 2, and the axial directions of the outer circumferential support members 3 were made to intersect one another, the present invention is not limited to this structure. For example it would also be acceptable, by varying the directions of twisting of two of the members of the tubular fuel cell which neighbor one another in the radial direction, to make the axial directions of these two members intersect one another: as by, for example, along with twisting the center support members in the clockwise direction, also twisting the auxiliary outer circumferential support members in the anticlockwise direction, and moreover twisting the outer circumferential support members in the clockwise direction.

Furthermore although, in the embodiment described above, the example was shown of a case in which a plurality of center support members 1, a plurality of auxiliary outer circumferential support members 2, and a plurality of outer circumferential support members 3 were twisted, the present invention is not limited by this format; it would be acceptable for one or more among these three members not to be twisted. However, from the point of view of enhancing the resilience against bending stress and the like, it is desirable to twist together a plurality of center support members; and, from the point of view of easily and effectively intercepting shifting of the electrolytic component and the like, it is desirable to twist a plurality of auxiliary outer circumferential support members and/or a plurality of outer circumferential support members.

In addition although, in the above explanation related to the tubular fuel cell according to an embodiment of the present invention and the manufacturing method thereof, hydrophilic processing was performed upon the center support member 1, while water-repellant processing was performed upon the auxiliary outer circumferential support members 2, the tubular fuel cell according to the present invention is not limited to this feature; it would also be acceptable not to perform such water-repellant processing and hydrophilic processing. However, if the structure shown in FIGS. 1 and 2 is employed, it becomes possible for the water which is created during the operation of the tubular fuel cell 10 to be present in the above-described gaps 7 in the state of water droplets, and it is also possible to suppress the occurrence of flooding by discharging these water drops to the exterior with the reaction gas flowing through the gaps 7. It should be understood that, if hydrophilic processing is performed upon the center support members, since it becomes possible for the above-described generated water to be absorbed by the center support members, accordingly it becomes possible to suppress flooding to yet a further level.

Up until now, using the figures, a tubular fuel cell has been explained which includes center support members 1, auxiliary outer circumferential support members 2, and outer circumferential support members 3 whose cross sectional shapes are formed as approximately perfect circles, but the cross sectional shapes of the center support members, the auxiliary outer circumferential support members, and the outer circumferential support members are not limited to this configuration. The cross sectional shapes of the center support members may be elliptical or star shaped (i.e., a shape having protrusions and recesses) or the like, or they may be shaped as shown in FIG. 3, with reaction gas flow paths formed in them. Furthermore, the auxiliary outer circumferential support members and outer circumferential support members according to the present invention may be shaped in any manner provided that they are capable of intercepting shifting of the electrolytic component; for example, it would also be acceptable for them to be shaped as elliptical, square, rectangular, hexagonal, or the like.

Moreover although, in FIGS. 1 and 2, the center support members 1 include seven wire rods, this is not limitative of the present invention; the number of center support members which are included in the tubular fuel cell according to the present invention may be set to any appropriate number greater than or equal to one. If the number of center support members which are included in the tubular fuel cell according to the present invention is one, then it is desirable, in order to ensure the diffusion path for the reaction gas in a simple and easy manner, to form the center support member, for example, with a reaction gas flow path upon its outer circumferential surface, and/or with concavities and convexities (protrusions and recesses) being present upon its outer circumferential surface (for example, with its cross sectional shape being a star shape or the like). Even if the number of center support members is one, if the format is employed in which the auxiliary outer circumferential support members and the outer circumferential support members are provided between the center support member and the electrolyte layer, then it is possible to provide a tubular fuel cell in which the diffusion of the reaction gas is enhanced, since it is possible to suppress shifting of the electrolytic component further inside than the auxiliary outer circumferential support members.

Yet further although, in FIGS. 1 and 2, an example was shown in which all of the center support members 1, which consisted of seven wire rods, functioned as an internal collector, the center support members according to the present invention are not limited to this feature. If the center support members according to the present invention have the form shown in the drawings, then it is desirable to provide a cooling path for the flow of a cooling medium upon the exterior of the outside catalyst layer 4b, in order to present excessive elevation of the temperature during the operation of the tubular fuel cell 10, or the like. By contrast, it would also be acceptable to endow these center support members with the further function of acting as cooling paths, by making some or all of the center support members (for example, among the center support members shown in FIG. 1, that center support member which is positioned in the center) as tubes, and by flowing a cooling medium through them.

Even further although, in the above-described embodiments of the present invention, a structure is disclosed in which a plurality of auxiliary outer circumferential support members and a plurality of outer circumferential support members are provided, the numbers of the auxiliary outer circumferential support members and of the outer circumferential support members are not limited to the structure shown in the figures. Provided that the resulting structure is capable of intercepting the shifting of the electrolytic component, it will be acceptable to provide any appropriate number of auxiliary outer circumferential support members and outer circumferential support members, in overall consideration of the gas diffusion and the collector efficiency and the like.

In addition although, in FIGS. 1 and 2, a structure was shown in which, when the diameters of the center support members are taken as being R3, the relationship R3>R2>R1 held, furthermore, from the aspect of being able to block the shifting of the electrolytic component in an effective manner, it is desirable for the relationship $0.5 \times R3 \geq R1 \geq 0.1 \times R3$ also to hold.

Furthermore although, in the above explanation, the axial directions of two assemblies (members) which adjoined one another in the radial direction of this tubular fuel cell (the center support members and the auxiliary outer circumferential support members, and the auxiliary outer circumferential support members and the outer circumferential support members) were caused to intersect one another by making their twist pitches different, the method of causing these axial directions to intersect one another is not limited to this structure. For example, it would also be possible to cause the above-described axial directions to intersect one another by making the direction of twisting of the member which is positioned upon the inside be the clockwise direction, and by making the direction of twisting of the member which is positioned upon the outside be the anticlockwise direction. Moreover although, up till this point, structures in which the center support members, the auxiliary outer circumferential support members, and the outer circumferential support members are twisted have been explained, the tubular fuel cell according to the present invention is not limited to such a structure; it would also be acceptable for one or more among these three members not to be twisted. However, from the point of view of effectively intercepting shifting of the electrolytic component, it is desirable to twist the auxiliary outer circumferential support members and the outer circumferential support members; and, from the point of view of enhancing the resilience against bending stress, it is desirable to twist together the center support members.

Yet further although, up to this point, examples have been disclosed in which the center support members 1, the auxiliary outer circumferential support members 2, and the outer circumferential support members 3 are made from copper wire whose surface is covered with titanium (Ti), the present invention is not limited to this. Provided that the center support members, the auxiliary outer circumferential support members, and the outer circumferential support members incorporated in the tubular fuel cell of the present invention are endowed with sufficient corrosion resistance to withstand the operating environment of a tubular fuel cell, and moreover that they are endowed with appropriate electrical conductivity to be capable of the electrical conduction performance which is demanded in a tubular fuel cell, they may be made of some other material (for example Au or Pt or the like).

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention claimed is:

1. A tubular fuel cell, comprising:
a plurality of center support members that serve as an internal collector forming gaps therebetween for reaction gas flow paths, the plurality of center support members including wire rods;
an electrolyte layer surrounding the center support member;
a plurality of outer circumferential support members disposed between the center support members and the electrolyte layer, each of the plurality of outer circumferential support members being a wire rod;
a catalyst layer disposed on an outer circumferential surface of each of the plurality of outer circumferential support members, the catalyst layer being in contact with the electrolyte layer; and
a plurality of auxiliary outer circumferential support members disposed between the plurality of center support members and the plurality of outer circumferential support members, each of the auxiliary outer circumferential support members being a wire rod and being wound around the plurality of center support members in a first direction such that each of the auxiliary outer circumferential support members laterally abuts adjacent auxiliary outer circumferential support members on opposite sides thereof,
wherein each of the plurality of outer circumferential support members is wound around the plurality of auxiliary outer circumferential support members in a second direction such that each of the outer circumferential support members laterally abuts adjacent outer circumferential support members on opposite sides thereof, and
wherein a diameter of each of the plurality of center support members is greater than a diameter of each of the plurality of auxiliary outer circumferential support members.

2. The tubular fuel cell according to claim 1, wherein the diameter of each of the auxiliary outer circumferential support members is smaller than a diameter of each of the outer circumferential support members.

3. The tubular fuel cell according to claim 2, wherein $$0.5 \times R3 \geq R1 \geq 0.1 \times R3,$$

where R1 is the diameter of each of the plurality of auxiliary outer circumferential support members, and R3 is the diameter of the center support member.

4. The tubular fuel cell according to claim 1, wherein at least one of the center support member, the plurality of auxiliary outer circumferential support members, and the plurality of outer circumferential support members has a helicoid shape about a central axis of the tubular fuel cell.

5. The tubular fuel cell according to claim 4, wherein an axial direction of the center support member and an axial direction of the plurality of auxiliary outer circumferential support members intersect.

6. The tubular fuel cell according to claim 5, wherein a first pitch at which the center support member is twisted is different from a second pitch at which the plurality of auxiliary outer circumferential support members is twisted.

7. The tubular fuel cell according to claim 5, wherein the center support member is twisted in a direction which is different from a direction in which the plurality of auxiliary outer circumferential support members is twisted.

8. The tubular fuel cell according to claim 4, wherein an axial direction of the plurality of auxiliary outer circumferential support members and an axial direction of the plurality of outer circumferential support members intersect.

9. The tubular fuel cell according to claim 8, wherein a first pitch at which the plurality of outer circumferential support members is twisted is different from a second pitch at which the plurality of auxiliary outer circumferential support members is twisted.

10. The tubular fuel cell according to claim 8, wherein the plurality of outer circumferential support members is twisted in a direction which is different from a direction in which the plurality of auxiliary outer circumferential support members is twisted.

11. The tubular fuel cell according to claim 4, wherein the plurality of auxiliary outer circumferential support members is twisted, and the plurality of outer circumferential support members is twisted.

12. The tubular fuel cell according to claim 1, wherein a cross sectional shape of the center support member is substantially a circle.

13. The tubular fuel cell according to claim 1, wherein a cross sectional shape of the center support member includes a protrusion and a recess.

14. The tubular fuel cell according to claim 1, wherein a surface of the center support member is hydrophilic.

15. The tubular fuel cell according to claim 1, wherein a surface of the plurality of auxiliary outer circumferential support members is water-repellant.

16. The tubular fuel cell according to claim 1, wherein the center support member comprises a tube, and wherein a cooling medium, that cools the tubular fuel cell, flows through the tube.

17. The tubular fuel cell according to claim 1, wherein the center support member, the plurality of auxiliary outer circumferential support members, and the plurality of outer circumferential support members are titanium-coated copper wires.

18. The tubular fuel cell according to claim 1, wherein the catalyst layer includes platinum-carrying carbon dispersed in a fluorine-containing ion-exchange resin, and the electrolyte layer includes a fluorine-containing ion-exchange resin.

* * * * *